(12) United States Patent
Uhm et al.

(10) Patent No.: US 8,885,241 B2
(45) Date of Patent: Nov. 11, 2014

(54) DISPLAY DEVICE

(71) Applicant: LG Display Co., Ltd., Seoul (KR)

(72) Inventors: Seongyong Uhm, Suwon-si (KR); Jinwuk Kim, Goyang-si (KR); Hwayoul Lee, Paju-si (KR); Junehwan Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/069,023

(22) Filed: Oct. 31, 2013

(65) Prior Publication Data

US 2014/0118814 A1 May 1, 2014

(30) Foreign Application Priority Data

Oct. 31, 2012 (KR) .......................... 10-2012-0122468

(51) Int. Cl.
*G02F 1/153* (2006.01)
*G02F 1/155* (2006.01)

(52) U.S. Cl.
CPC ...................................... *G02F 1/155* (2013.01)
USPC ........................................................ 359/273

(58) Field of Classification Search
CPC ............ G02F 1/15; G02F 1/153; G02F 1/157
USPC .................................. 359/265–275; 345/105
See application file for complete search history.

(56) References Cited

U.S. PATENT DOCUMENTS 7,869,113 B2 * 1/2011 Jang et al. ..................... 359/266

\* cited by examiner

*Primary Examiner* — Tuyen Tra
(74) *Attorney, Agent, or Firm* — Brinks Gilson & Lione

(57) ABSTRACT a display device includes a lower substrate with lower electrodes and an upper substrate with upper electrodes, a plurality of pixels between the lower substrate and the upper substrate, electrochromic particles that are implanted into the plurality of pixels, each electrochromic particle comprising a core and a shell layer surrounding the core, and reflective layers on the lower electrodes and corresponding to the plurality of pixels.

10 Claims, 2 Drawing Sheets

DISPLAY DEVICE

This application claims the benefit of priority to Korean Patent Application No. 10-2012-0122468 filed on Oct. 31, 2013, which is incorporated herein by reference for all purposes as if fully set forth herein.

BACKGROUND

1. Field of the Disclosure

Embodiments of the disclosure relates to a reflective display device, and more particularly, to a display device comprising color enhancers.

2. Discussion of the Related Art

A reflective display is a display device that displays information by using external light without a light source. An electrophoretic display, which is the most common reflective display, is a display device that induces electrophoresis of charged particles dispersed in a nonpolar solvent on a display surface under the action of an electrical field and displays an image using the optical properties of the solvent and the particles. The above electrophoresis display (EPD) has a lower power consumption than other flat panel displays (FPDs) and can keep displaying without power supply. Electronic paper, one of the most common implementation of an electrophoretic display, is drawing attention.

In general, electrophoretic displays are commonly classified into a microcapsule type electrophoretic display from E-Ink Corporation, which has microcapsules of charged particles thinly arranged and implanted into a dispersion solvent, and a microcup type electrophoretic display from Sipix, which has particles implanted into each of cups made in a microsize. In the microcapsule type electrophoretic display, encapsulated charge carriers are dispersed in a solvent filled with a specific dispersion solvent. As the microcapsules are charged by an electrical field, black and white are displayed on the opposing display electrodes. Also, color filters, a fluid colored with a dye or pigment, or colored electrophoretic particles are used to represent colors on upper edges of the display device, thereby implementing the electrophoretic display.

Meanwhile, an electrowetting apparatus disclosed in Korean Laid-Open Patent No. 2012-0021075 relates to a display device which displays different colors in such a way that a hydrophobic insulating material is laminated on an electrode, a voltage is applied to the water and the electrode when water and oil come in contact and causes the water contact angle to be decreased as the hydrophobic interface of the water becomes hydrophilic, and light is reflected from the reflecting electrode when the oil is pushed toward the pixel walls as the water contact angle is decreased. Accordingly, colors are represented by dispersing or dissolving a dye or pigment in an aqueous solution within color filters or cells.

Korean Laid-Open Patent No. 2010-0020105 discloses a technology, which represents black and other colors by using electrochromic elements as color filters for an electrophoretic display containing black and white particles. The color filters disclosed in this technology represent colors as red, green, and blue electrochromic materials are applied to each pixel by using electrochromism, which is displayed by some materials that change their color due to an oxidation and reduction when a voltage is applied.

A colored electrphoretic display is implemented in such a way that color filters are positioned on an upper plate to give a color to reflected light. Other implementations include driving electrophoretic particles in a colored fluid and driving colored electrophoretic particles in a transparent fluid. The colored electrophoretic display using color filters involves additional materials and additional process costs for the color filters to represent colors, which becomes a primary factor in the rise in unit cost, and also is not desirable in terms of the brightness and sharpness of colors basically due to light absorbed into a color filter layer when displaying colors. Moreover, the use of a colored fluid is not desirable because most of light is reflected from the upper edge of the colored fluid. In addition, the method of driving colored electrophoretic particles is disadvantageous in that the reflectance and color of light are determined by white particles that reflect the light.

U.S. Pat. Nos. 6,017,584 and 7,012,735 propose a display device using electrophoresis in which dual-colored electrophoretic particles charged with black and color are encapsulated. However, it is difficult for this display device to represent multiple colors, but it can only represent shades of black and white. In order to represent multiple colors, it is necessary to apply color filters to the upper portion, like in a liquid crystal display device. This leads to low reflectance and makes it hard to control the size of capsules, thus facing the problem causing difficulties in controlling the driving speed of the particles and the contrast ratio of pixels.

Korean Patent No. 2005-0055557 discloses a method of microencapsulation of a pigment as a color enhancer in the manufacture of multi-color electrophoretic particles. However, light transmittance is lowered due to increased crystallinity of the pigment particles and increased particle size. Therefore, reflectance may be reduced when pixels are displayed, and coloring power reduction may occur due to the migration of the pigment during the manufacture of the particles.

In addition, the technology disclosed in U.S. Patent No. 2009-0009852 is disadvantageous in that the process of incorporating an ionic monomer in pigment particles and the centrifugation of polymerization by-products and residual monomers in the subsequent polymerization process need to be performed repeatedly, which is cumbersome, and it is hard to adjust the degree of polymerization to achieve desired dispersion force.

Further, in Korean Laid-Open Patent No. 2010-0048076, an electrochromic layer is introduced and used as a reversible color filter layer, which is, however, not appropriate to represent a wider color area. Also, the electrowetting display disclosed in Korean Laid-Open Patent No. 2012-0021075 uses color filters and a reflective plate separately and therefore cannot achieve high reflectance and high color reproductivity because incident light is absorbed and scattered by the color filters.

Korean Laid-Open Patent No. 2010-0020105, which uses electrochromic elements as color filters for an electrophoretic display containing black and white particles to display black and other colors, is disadvantageous in that color reproductivity is low and it is difficult to represent pure colors.

SUMMARY

A display device includes a lower substrate with lower electrodes and an upper substrate with upper electrodes, a plurality of pixels formed between the lower substrate and the upper substrate, electrochromic particles that are implanted into the plurality of pixels, each electrochromic particle comprising a core and a shell layer surrounding the core, and reflective layers formed on the lower electrodes and corresponding to the plurality of pixels.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Figure 1:
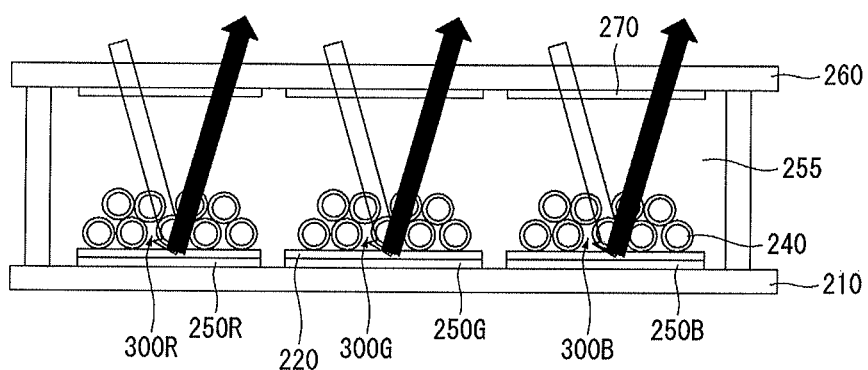
FIG. 1 is a cross-sectional view showing a display device according to an exemplary embodiment of the present invention

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

The present invention relates to color enhancers for implementing a color reflective display and a display device comprising the same, and more particularly, to color enhancers respectively included in red, green, and blue reflective layers provided in a display device.

The above-described reflective layers may form red, green, and blue color layers, and may further form a white color layer. To represent red, green, and blue colors, each reflective layer comprises a separate coloring agent. An organic pigment or dye having anthraquinone, di-pyrrolo-pyrrole, isoindolinon, azo pyridone, azo pyrrolidone, diazo diarylide, triarylmethane, phtalocyaine, quinophthalone, thioindigoid, thioxanthene, and xanthenes group is used as a color enhancer.

Color enhancers of the following chemical formulae 1 through 3 are used for the reflective layers in order to achieve high reflectivity and represent colors. They serve to absorb light of an infrared or UV short wavelength region and emit the light towards a longer wavelength side to increase reflectivity.

More particularly, the red color enhancer included in the red reflective layer in the present invention is represented by the following Chemical Formula 1:

[Chemical Formula 1]

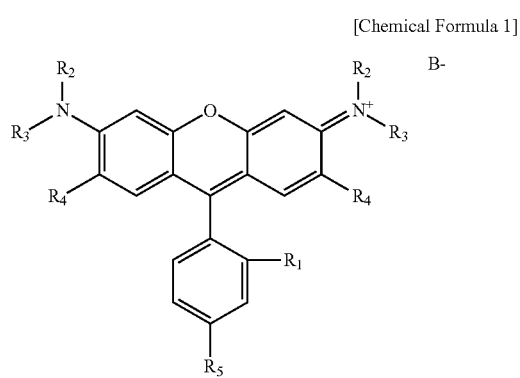

wherein $R_1$ and $R_5$ each independently are any one selected from the group consisting of hydrogen, an alkyl group with 1 to 8 carbon atoms, an alkenyl group with 2 to 8 carbon atoms, COOH, $SO_3H$, $CONH_2$, $SO_2NH_2$, NCS, or a heteroatom-containing substituent, $R_2$, $R_3$, and $R_4$ each independently are any one selected from the group consisting of hydrogen, an alkyl group with1 to 6 carbon atoms, an alkenyl group with 2 to 12 carbon atoms, an aryl group with 6 to 12 carbon atoms, an aralkyl group with 7 to 12 carbon atoms, a heterocyclic ring with 4 to 17 carbon atoms which contains nitrogen atoms linked to these groups, or a heteroatom-containing substituent, and B is any one selected from the group consisting of $SO_3—$, $NO_2—$, $Cl—$, $Br—$, $PO_3—$, or $CN—$ which is a complex salt with negative charge.

The green color enhancer included in the green reflective layer is represented by the following Chemical Formula 2:

[Chemical Formula 2]

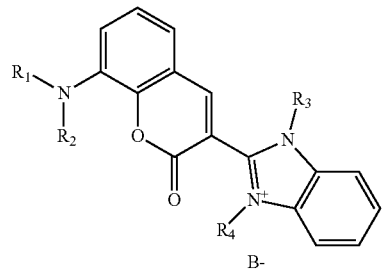

wherein $R_1$ and $R_2$ each independently are any one selected from the group consisting of hydrogen, an alkyl group with 1 to 16 carbon atoms, an alkenyl group with 2 to 21 carbon atoms, an aryl group with 6 to 21 carbon atoms, an aralkyl group with 7 to 21 carbon atoms, a heterocyclic ring with 4 to 17 carbon atoms which contains nitrogen atoms linked to these groups, or a heteroatom-containing substituent, $R_3$ and $R_4$ each independently are any one selected from the group consisting of hydrogen, an alkyl group with 1 to 8 carbon atoms, an alkenyl group with to 8 carbon atoms, or a hetero atom-containing substituent, and B is any one selected from the group consisting of $SO_3—$, $NO_2—$, $Cl—$, $Br—$, $PO_3—$, or $CN—$ which is which is a complex salt with negative charge.

The blue color enhancer included in the blue reflective layer is represented by the following Chemical Formula 3:

[Chemical Formula 3]

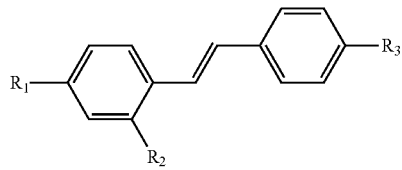

wherein $R_1$, $R_2$, and $R_3$ each independently are any one selected from the group consisting of an alkyl group, a ketone group, an acryl group, a methacryl group, an aryl group, an aromatic group, a halogen group, an amino group, a mercapto group, an ether group, an ester group, an alkoxy group, a sulfone group, a nitro group, a hydroxy group, a cyclobutene group, a carbonyl group, a carboxyl group, a urethane group, a vinyl group, a nitrile group, hydrogen, or a heteroatom-containing substituent.

The color enhancers represented by Chemical Formulae 1 through 3 are used at 10 to 300% by weight of the above-described coloring agents. If the content of the color enhancers is less than or equal to 300% by weight of the coloring agents, this prevents lowering of color reproduction of each color. If the content of the color enhancers is more than or equal to 10% by weight of the coloring agent, this improves the reflectance of the reflective layers.

Figure 2:
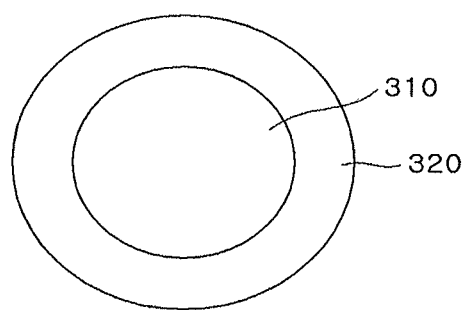
FIG. 2 is a view showing electrochromic particles according to the exemplary embodiment of the present invention.

Hereinafter, a display device comprising color enhancers according to color enhancers according to an exemplary embodiment of the present invention will be described. FIG. 1 is a cross-sectional view showing a display device according to an exemplary embodiment of the present invention. FIG. 2 is a view showing electrochromic particles according to the exemplary embodiment of the present invention.

Referring to FIG. 1, a display device 200 according to an exemplary embodiment of the present invention has electrochromic particles implanted in red, green, and blue pixels. More particularly, the display device 200 comprises a lower substrate 210 with lower electrodes 220, an upper substrate 260 with upper electrodes 270, and red, green, and blue pixels 300R, 300G, and 300B with elecrochromic particles 240 implanted in respective pixel areas.

The lower substrate 210 may be made of a transparent glass substrate, and the upper substrate 260 may be made of a PET (polyethylene terephthalte) film. The lower electrodes 220 of the pixels are formed on the lower substrate 210, and areas of the red, green, and blue pixel 300R, 300G, and 300B are formed over the lower electrodes 220. Reflective layers for reflecting external light are positioned in the respective pixel areas. The red pixel 300 has a red reflective layer 250R, the red pixel 300G has a green reflective layer 250G, and the blue pixel 300B has a blue reflective layer 250B.

Electrochromic particles 240 are dispersed in an electrolyte in the red, green, and blue pixels 300R, 300G, and 300B. An electrochromic particle consists of a core and a shell. Referring to FIG. 2, an electrochromic particle 240 according to the exemplary embodiment of the present invention comprises a core 310 that emits either red, green, or blue and a shell 320 that surrounds the core 310 and is made of an electrochromic material that allows light to be transmitted therethrough or emits chromatic colors.

The core 310 is made of a material that shows excellent transmittance for visible light. For example, the core 310 may be made of ITO (Indium Tin Oxide). The core 310 has a size of 1.0 nm to 200 nm, more preferably, 5 nm to 100 nm, and is spherical or amorphous. The core 310 may be made of a porous material in order to improve the color changing properties of the shell 320, or a conductive core material in order to increase the mobility of electrons, Materials which show higher transmittance for visible light, facilitate the flow of electrons better, and have a larger specific surface area will be more advantageous.

The shell 320 is made based on the principle that an electrochromic material changes its color reversibly as it undergoes an oxidation or reduction by ions or electrons. Examples of the electrochromic material may include an inorganic electrochromic material selected from the group consisting of $WO_3$, $NiOxHy$, $Nb_2O_5$, $TiO_2$, $MoO_3$, $V_2O_5$, etc. Other examples of the electrochromic material may include polymers comprising repeating units derived from thiophene, carbazole, phenylene vinylene, acetylene, aniline, phenylenediamine, and pyrrole monomers, etc. other examples of the electrochromic material may include a conductive polymer selected from the group consisting of viologen derivatives, phenothiazine, and tetrathiafulvalene. However, any materials can be used as long as they do not disturb the shell layer outside the particles from becoming transparent and allowing light to be transmitted therethrough by electrochromism.

The electrochromic material of the shell 320 in the present invention involves black and white color blocking and transparent transmission. Hence, the electrochromic material should be a material that changes its color to from transparent to black or vice versa. When it is hard to represent black with a single color, the electrochromic material may emit the following combinations of chromatic colors; that is, black may be represented by a combination or cyan, yellow, and magenta or a combination of red, green, and blue.

The electrochromic material constituting the shell 320 surrounding the core 310 is chemically linked to the core 310 by a linker. The linker may be any material, as long as it can be linked to the core 310 and linked to the electrochromic material of the shell 320 by a synthesis reaction with the shell 320. For example, a material such as 3-aminopropyltriethoxysilane may be used. The core/shell-shaped electrochromic particles prepared in the present invention are dispersed and used in a transparent electrolyte fluid, or mixed in a transparent solid electrolyte or polymer/gen electrolyte and formed in a coating or film.

The thus-prepared particles 240 are activated when the shell 320 comprising the electrochromic material blocks the color of the core 310 or allows it to be transmitted therethrough upon voltage application. For example, if the shell 320 can change from black to transparent or vice versa, when the shell 320 is black, black is represented as external incident light is blocked, and when the shell 320 is transparent, red, green, and blue are represented as external light is reflected on the reflective layers 250R, 250G, and 250B of the pixels.

Hereinafter, the color enhancers and the display comprising the same according to the present invention will be described in more detail in the following experimental examples. However, the experimental examples given below are provided only to illustrate the invention and the present invention is not limited to these experimental examples.

EXAMPLE 1

Preparation of Electrochromic Particles 30 g of indium tin oxide having a primary particle diameter of 20 nm, 50 g of ethanol, and 120 g of zirconia beads were placed into a 50 mL wide-mouth bottle and dispersed for five hours by a paint shaker and then the beads were removed to prepare an indium tin oxide dispersion solution. In addition, 15.6 g (100 m mol) of 4,4-biprydine, 13.4 g (100 m mol) of chloroethylacrylate, and 00 g of acetonitrile were added to a three-necked flask under a nitrogen atmosphere and circulated for 48 hours at 60° C., and thereafter 9.6 g (50 m mol) of bromooctane, 4.1 g (30 m mol) of 4-chlorrobenzonitrile, 3.4 g (20 m mol) of chlorosalicylic acid, and 100 g of acetonitrile were added to the mixture and circulated for 24 hours at 45° C. After that, the mixture was washed with ethyl ether and recrystallized in a mixture solution of acetone/ethyl ether (2:1) to obtain a light-yellow material.

5 g of the light-yellow material and 3 g of divinylbenzene were dissolved in 10 g of toluene, and then poured into a mixture solution of the indium tin oxide dispersion solution having 5% by weight of solids, 0.5 g of ammonium persulfate, 0.2 g of lauric acid sodium salt as a surfactant agent, and 250 g of water, stirred at high speed, heated to 70° C. and reacted for 12 hours to prepare electrochromic particles by washing and centrifugation.

EXAMPLE 2

Preparation of Red Photosensitive Resin Composition

To prepare a red photosensitive resin composition, pigment red 254 (color index: 56110, TCI AMERICA), and white titanium oxide (R104, Dupont) were mixed at a weight ratio of 1:30, and a phosphor material of Chemical Formula 1 was added at 0.1% by weight to the mixture to prepare a pigment dispersion solution with 15% solids. Appropriate amounts of soluble resin, a multifunctional monomer, a photoinitiator, and PGMEA were mixed together to prepare a red photosensitive resin composition.

EXAMPLE 3

Preparation of Green Photosensitive Resin Composition

A red photosensitive resin composition was prepared in the same method as the foregoing Example 2, except that Pigment green 58 (DIC) of the same weight was used in place of Pigment red 254.

EXAMPLE 4

Preparation of Blue Photosensitive Resin Composition

A blue photosensitive resin composition was prepared in the same method as the foregoing Example 2, except that C.I Pigment blue 15:6 (HUPC chemical) was used in place of Pigment red 25, mixed with white titanium oxide at a weight ratio of 1:40, and a phosphor material of Chemical Formula 3, instead of a phosphor material of Chemical Formula 1, was added at 0.1% by weight.

EXAMPLE 5

Preparation of White Photosensitive Resin Composition

A white photosensitive resin composition was prepared in the same method as the foregoing Example 2, except that Pigment red 254 and Chemical Formula 1 were not used but only white titanium oxide was used to prepare a pigment dispersion solution with 15% solids.

EXAMPLE 6

Preparation of Light Shutter Layer Comprising Reflective Layer

The red, green, blue, and white photosensitive resin compositions prepared in the foregoing Examples 2 through 5 were coated on glass, exposed overall to light, and baked at 200° C. to form red, green, blue, and white reflective layers. Each reflective layer was deposited with indium tin oxide and cut to a 1.1-inch size, respectively, and then 1.1-inch indium oxide glass with a 3 μm thickness barrier on the side was encapsulated with photo-curable epoxy resin to prepare cells each having a reflective layer. Moreover, 5.0 g of the electrochromic particles prepared in the foregoing Example 1 were added to 20.0 g of propylene carbonate with 0.1 mol of LiClO4 dissolved therein and then uniformly dispersed with ultrasonic waves to prepare a light shutter forming solution. The light shutter forming solution was implanted into the cells each having a reflective layer, thereby forming a light shutter layer.

The thus-prepared cell was aged 50 times every 10 seconds by applying +2.5 and −2.5 volt voltages. After that, the color coordinates at on (black)/off (color red/green/blue/white) were measured by DMS803 (spectrophotometer manufactured by Konica Minolta) and shown in the following Table 1, and the reflectance was measured and shown in FIGS. 3 and 4.

TABLE 1

| # Color | On/Off | Color coordinates CIE_x | CIE_y | Reflectance (%) | Contrast ratio (C/R) |
|---|---|---|---|---|---|
| Example 2 | On | 0.278 | 0.278 | 3.8 | 10.5 |
| red | Off | 0.443 | 0.312 | 40.2 | |
| Example 3 | On | 0.279 | 0.308 | 3.9 | 13.4 |
| green | Off | 0.343 | 0.404 | 52.4 | |
| Example 4 | On | 0.246 | 0.264 | 3.0 | 8.0 |
| blue | Off | 0.211 | 0.227 | 24.3 | |
| Example 5 | On | 0.268 | 0.284 | 3.8 | 15.8 |
| white | Off | 0.299 | 0.322 | 59.4 | |

Figure 3:
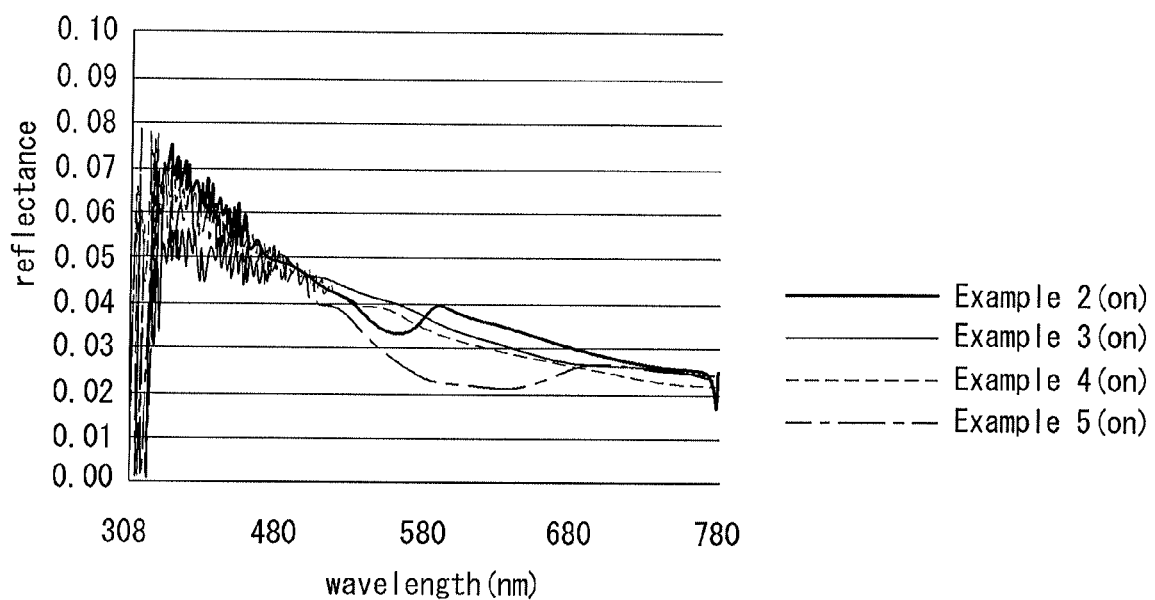
FIGS. 3 and 4 are graphs showing the measurements of reflectance depending on the on/off driving of a light shutter layer prepared according to the exemplary embodiment of the present invention.
Figure 4:
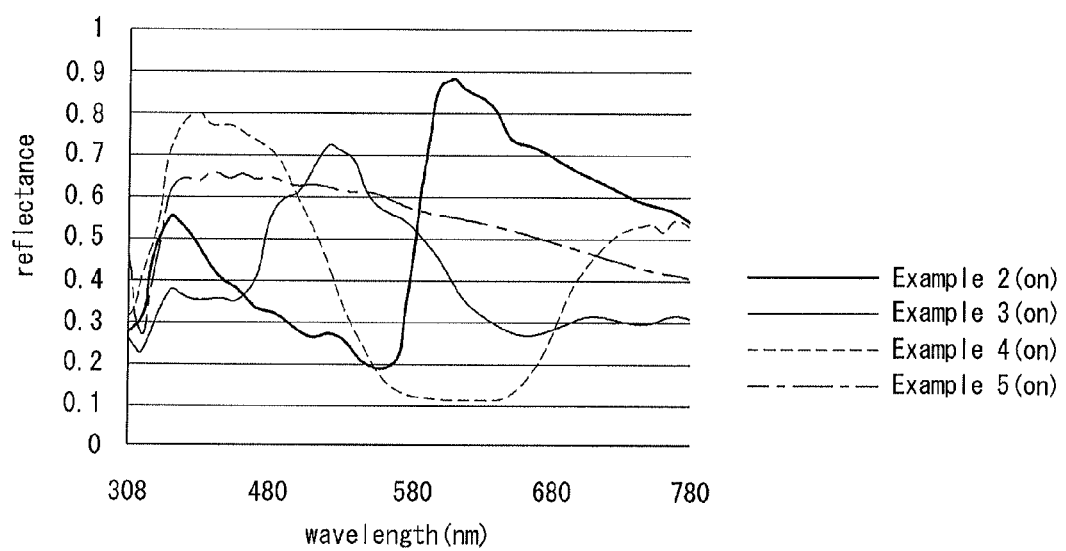

Referring to Table 1 and FIGS. 3 and 4, it was found that, when a voltage was applied (on), the reflectance was below 4% and black was represented, and that when no voltage was applied (off), colors appeared from the lower reflective layers and the light shutter layer became transparent.

As seen from above, the color enhancers according to the exemplary embodiment of the present invention can improve the reflectance of red, green, and blue as they are included in the reflective layers of the light shutter layer provide in the display device. Accordingly, the contrast ratio of the display device can be improved, and high display quality can be achieved even at a low driving voltage.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a lower substrate with lower electrodes and an upper substrate with upper electrodes;
   a plurality of pixels between the lower substrate and the upper substrate;
   electrochromic particles that are implanted into the plurality of pixels, each electrochromic particle comprising a core and a shell layer surrounding the core; and
   reflective layers on the lower electrodes and corresponding to the plurality of pixels.

2. The display device of claim 1, wherein a diameter of the core is between 10 to 200 nm.

3. The display device of claim 1, wherein the shell layer comprises an electrochromic material, and the electrochromic material comprise an inorganic electrochromic material selected from the group consisting of $WO_3$, $NiOxHy$, $Nb_2O_5$, $TiO_2$, $MoO_3$, and $V_2O_5$, or polymers comprising repeating units derived from thiophene, carbazole, phenylene vinylene, acetylene, aniline, phenylenediamine, and pyrrole monomers, or conductive polymer selected from the group consisting of viologen derivatives, phenothiazine, and tetrathiafulvalene.

4. The display device of claim 1, wherein the shell becomes transparent or black depending on an electrical field.

5. The display device of claim 4, wherein the shell consists of a combination of a red electrochromic material that becomes transparent or red depending on an electrical field, a green electrochromic material that becomes transparent or green depending on an electrical field, and a blue electrochromic material that becomes transparent or blue depending on an electrical field,
wherein the red, green, and blue electrochromic materials represent red, green, and blue, respectively, and a combination thereof represents black.

6. The display device of claim 4, wherein the shell comprises a combination of a cyan electrochromic material that becomes transparent or cyan depending on an electrical field, a magenta electrochromic material that becomes transparent or magenta depending on an electrical field, and a yellow electrochromic material that becomes transparent or yellow depending on an electrical field,
wherein the cyan, magenta, and yellow electrochromic materials represent cyan, magenta, and yellow, respectively, and a combination thereof represents black.

7. The display device of claim 1, wherein the reflective layers comprise a red reflective layer, a green reflective layer, and a blue reflective layer,
the red reflective layer comprising a red color enhancer, the green reflective layer comprising a green color enhancer, and the blue reflective layer comprising a blue color enhancer.

8. The display device of claim 7, wherein the red reflective layer comprises a red color enhancer represented by the following Chemical Formula 1:

[Chemical Formula 1]

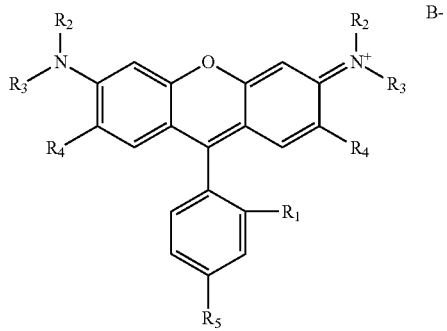

wherein $R_1$ and $R_5$ each independently are any one selected from the group consisting of hydrogen, an alkyl group with 1 to 8 carbon atoms, an alkenyl group with 2 to 8 carbon atoms, COOH, $SO_3H$, $CONH_2$, $SO_2NH_2$, NCS, or a heteroatom-containing substituent, $R_2$, $R_3$, and $R_4$ each independently are any one selected from the group consisting of hydrogen, an alkyl group with 1 to 6 carbon atoms, an alkenyl group with 2 to 12 carbon atoms, an aryl group with 6 to 12 carbon atoms, an aralkyl group with 7 to 12 carbon atoms, a heterocyclic ring with 4 to 17 carbon atoms which contains nitrogen atoms linked to these groups, or a heteroatom-containing substituent, and B is any one selected from the group consisting of $SO_3$—, $NO_2$—, Cl—, Br—, $PO_3$—, or CN— which is a complex salt with negative charge.

9. The display device of claim 7, wherein the green reflective layer comprises a green color enhancer represented by the following Chemical Formula 2:

[Chemical Formula 2]

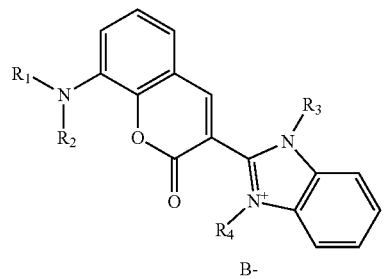

wherein $R_1$ and $R_2$ each independently are any one selected from the group consisting of hydrogen, an alkyl group with 1 to 16 carbon atoms, an alkenyl group with 2 to 21 carbon atoms, an aryl group with 6 to 21 carbon atoms, an aralkyl group with 7 to 21 carbon atoms, a heterocyclic ring with 4 to 17 carbon atoms which contains nitrogen atoms linked to these groups, or a heteroatom-containing substituent, $R_3$ and $R_4$ each independently are any one selected from the group consisting of hydrogen, an alkyl group with 1 to 8 carbon atoms, an alkenyl group with 2 to 8 carbon atoms, or a hetero atom-containing substituent, and B is any one selected from the group consisting of $SO_3$—, $NO_2$—, Cl—, Br—, $PO_3$—, or CN— which is a complex salt with negative charge.

10. The display device of claim 7, wherein the blue reflective layer comprises a blue color enhancer represented by the following Chemical Formula 3:

[Chemical Formula 3]

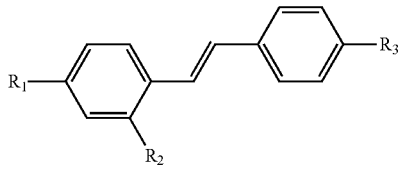

wherein $R_1$, $R_2$, and $R_3$ each independently are any one selected from the group consisting of an alkyl group, a ketone group, an acryl group, a methacryl group, an aryl group, an aromatic group, a halogen group, an amino group, a mercapto group, an ether group, an ester group, an alkoxy group, a sulfone group, a nitro group, a hydroxy group, a cyclobutene group, a carbonyl group, a carboxyl group, a urethane group, a vinyl group, a nitrile group, hydrogen, or a heteroatom-containing substituent.

* * * * *